Jan. 5, 1971   R. E. DOLLINGER ET AL   3,552,211
MIXED PHASE SAMPLING SYSTEM
Filed Oct. 9, 1968

INVENTORS
R. E. DOLLINGER
R. H. KALLENBERGER
A. E. FRAZIER

BY

Young & Quigg
ATTORNEYS

United States Patent Office 3,552,211
Patented Jan. 5, 1971

3,552,211
MIXED PHASE SAMPLING SYSTEM
Robert E. Dollinger, Borger, Tex., Robert H. Kallenberger, Bartlesville, Okla., and Arthur E. Frazier, Borger, Tex., assignor to Phillips Petroleum Company, a corporation of Delaware
Filed Oct. 9, 1968, Ser. No. 766,145
Int. Cl. G01n 1/24
U.S. Cl. 73—421.5                  5 Claims

ABSTRACT OF THE DISCLOSURE

A sample of the gas included in carbon black smoke is obtained by drawing the gas sample through a reversible-flow filter and a first and a second cooler. A compressor, which draws the gas sample into the apparatus, is connected between the first and second coolers and has a conduit routed back to the filter. Thus, a portion of the sample gases withdrawn through the filter, first cooler and compressor is reintroducable to the filter for cleaning solids from the filter.

---

Figure 1:
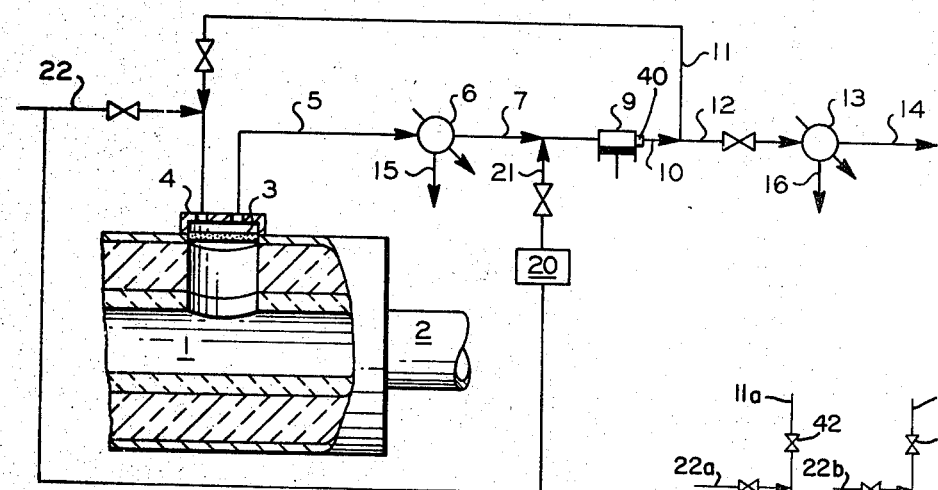

This invention relates to sampling systems.

In one of its more specific aspects, this invention pertains to mixed phase sampling systems.

It is frequently desirable to continuously secure representative samples of process streams containing both gases and particulate solids. Such systems are difficult to sample if it is desired to recover only the gas because the gas is generally separated from the solids by filtering and the solids tend to plug the filter. Additional difficulties are involved in obtaining samples if the system is operated under low pressure and high temperature in such cases if the nature of the solids cause their adherence to the filter. Further difficulties are involved if the gas sample contains fractions which condense within the sampling system.

There has now been developed a stream sampling system which is operable either intermittently or continuously and which includes, in combination, phase separating means for separating the phases of the system, cooling means in communication therewith for condensing condensibles from the sample, evacuating means interrelated to the cooling means for producing flow from the process stream into the sampling system and cooling means on a discharge of the evacuating means for further removal of condensibles from the sample before its being routed to its destination.

In one embodiment of this invention, means are provided for introducing into the process stream some portion of the sample or a quantity of a gaseous material from an extraneous source for the purpose of cleaning or "backwashing" the gas separation means.

Accordingly, it is an object of this invention to provide a new sampling means.

It is a further object of this invention to provide a sampling system by which samples representative of the process stream are obtainable.

While the apparatus of this invention is usable in a large number of processes, it will be discussed with reference to the carbon black process since obtaining samples from such a system generally involves all the complexities commonly met and previously referred to. Such discussion is not, however, intended to limit its applicability thereto.

The phase separation means employed in the apparatus of this invention will consist of a porous element which acts as a filter and facilitates separation between the phases within the process stream. Any suitable type filter fabricated of materials necessary to withstand the conditions of the process stream within which the filter is placed, can be used.

A particularly suitable filter for installation in a carbon black reactor effluent stream after the initial quench is a porous stainless steel filter.

Interconnected to the phase separation means will be cooling means. Such cooling means will consist of an exchanger by which that material withdrawn from the system will be cooled at least to a temperature which can be tolerated by subsequent equipment. Any type conventional cooler will be satisfactory.

The evacuation means will normally consist of a compressor capable of evacuating the sample from the system at low suction pressure and increasing its pressure to facilitate its passage through the subsequent aftercooling means and to its ultimate destination, and to reintroduce some portion of the sample through the filter at a pressure suitable for backwashing of the filter.

The aftercooling means will be similar to the cooling means and will serve to condense from the sample some portion of the condensible materials.

The apparatus of this invention will be explained as installed to sample the product gases, or smoke, downstream of the quench section of a carbon black reactor and prior to the bag filters. At this point, the effluent consist principally of carbon dioxide, carbon monoxide, water vapor, nitrogen, hydrogen and residual hydrocarbons with carbon black particles suspended therein. This stream is at about 600° F. and at a pressure of about 1 to about 3 p.s.i.g. These conditions make the obtaining of a representative gas sample exceedingly difficult when employing conventional sampling methods.

The description of the apparatus of this invention will be explained by reference to the attached drawings in which FIG. 1 indicates the apparatus in schematic relationship, and FIG. 2 indicates one type of phase separation means.

Figure 3:
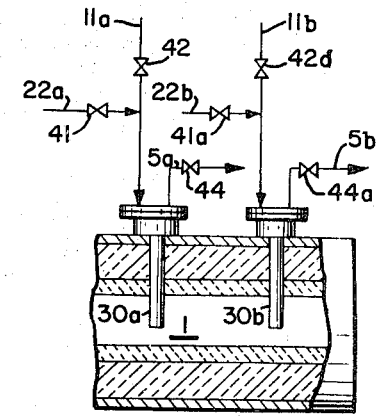

FIG. 3 indicates two separate phase separation means in contact with the system.

Referring now to FIG. 1, there is shown the downstream end of insulated carbon black reactor 1 with exit conduit 2 leading therefrom to subsequent processing equipment. In the shell of reactor 1 there has been installed filter 3 enclosed by hood 4, filter 3 being in direct contact with the smoke flowing through the reactor.

Filter 3 can be installed in reactor 1 in any suitable manner. It can be suspended in the stream to be sampled or it can form an integral portion of the conduit through which the process stream flows. In the embodiment shown in FIG. 1, it is an integral portion of the reactor shell.

Hood 4 is entered by conduit 5. Conduit 5 is interconnected to cooler 6 which has any suitable heat exchange medium flowing therethrough in heat exchange with that material introduced through conduit 5. Flow from cooler 6 is through conduit 7 into compressor 9, flow from compressor 9 being through discharge port 40 of compressor or evacuation means 9 into conduits 10 and 12 into cooler 13 in which further cooling of the gas is made. Flow from cooler 13 is through conduit 14 to the destination.

Condensibles, if any, flow to disposal from exchanger 6 through conduit 15 and from cooler 13 through conduit 16.

Gas flow can be routed from compressor 9 through conduit 1 into hood 4. Conduit 22 is also in open communication with hood 4.

On the suction side of compressor 9, conduit 21 provides communication between gas supply 20 and compressor 9.

In the operation of this system, with hood 4 under reduced pressure by operation of compressor 9, gases are separated from the carbon black at filter 3 and flow through conduit 5 into cooler 6 where some portion of the water vapor can be condensed out, depending upon the optional temperature to which the gases are cooled. The condensate leaves the cooler 6 through conduit 15, the gases passing through conduit 7 and through compressor 9 and into cooler 13, additional water vapor being condensed out therein and discharged through conduit 16, the sample gases passing to disposal through conduit 14.

Inasmuch as the filter occasionally will become obstructed to passage of gases therethrough, it can be cleaned, or "backwashed" in several ways. Suitable gas, such as from gas supply 20, or steam at sufficient pressure may be introduced under hood 4 through conduit 22. Suitable gases can be supplied to the suction side of the compressor from storage source 20, these being discharged from the compressor through conduit 11 into hood 4. Similarly, a storage vessel or purge gas pot can be installed in the system downstream of the compressor from which gases automatically enter hood 4 to clean filter 3 upon decrease in the pressure in conduit 5 to a prearranged value, valves for such functioning being installed for automatic operation to affect this step.

Figure 2:
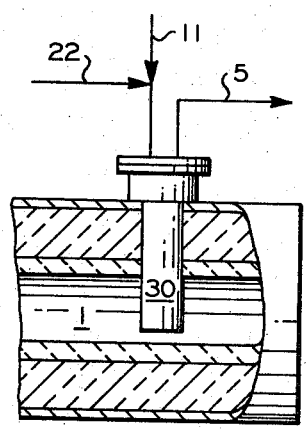

FIG. 2 shows an alternate type filter 30 in the form of a porous sleeve suitably positioned in flanged arrangement into the reactor, conduits 5 and 22 having access thereinto through the flanges.

Various modifications can be made to the apparatus described herein. For example, a filter guard can be installed for supplementary filtering of the sample after final cooling, or at any point in the system. Automatic pressure control can be maintained on the flow from the sampling equipment by conventional pressure control and vent means. Automatic condensate traps can be installed in conjunction with the coolers. Further, two separate sampling filters may be installed in one reactor as shown in FIG. 3, one being operated while the other is being cleaned, change from one to the other being sequential and dependent upon operation of automatic pressure control devices incorporated in the system. In FIG. 3, the two separate phase separation means 30a and 30b are shown positioned within reactor 1. These phase separation means are adapted for automatic alteration of flow and for simultaneous flow from each of them by means of valves 41, 41a, 42, 42d, 44 and 44a which may be mechanically or electrically actuated, as for example, solenoid valves. These valves can be interrelated by means known to those skilled in the art to provide for either of the aforementioned flows, such interrelation constituting no part of this invention. However, these and similar modifications are considered within the scope of the invention.

What is claimed is:
1. A mixed phase sample system for obtaining a gaseous sample from a system comprising gases and particulate matter suspended therein which comprises at least one phase separation means in contact with such system, a first cooling means connected to said phase separation means, evacuation means having suction and discharge ports, said suction port being connected to said first cooling means and said discharge port being connected to said phase separation means, and a second cooling means connected to said discharge port.

2. The apparatus defined in claim 1 in which storage means is connected to the suction port of said evacuation means.

3. The apparatus defined in claim 2 in which said storage means is connected to said phase separation means and the discharge port of said evacuation means.

4. The apparatus of claim 1 in which two separate phase separation means are in contact with said system, the first of said two separate phase separation means being adapted to receive said gaseous sample during a first period, and the second of said two separate phase separation means being adapted for reverse flow cleaning during said first period, and said first of said two separate phase separation means being adapted for reverse flow cleaning during a second period, and said second of said two separate phase separation means being adapted to receive said gaseous sample during said second period.

5. The apparatus of claim 4 in which said separation means is adapted for automatic alteration of flow therethrough to and from said evacuation means.

References Cited
UNITED STATES PATENTS

| | | | |
|---|---|---|---|
| 3,043,145 | 7/1962 | Hoffman | 73—421.5 |
| 3,438,261 | 4/1969 | Collins, Jr. | 73—421.5 |

LOUIS R. PRINCE, Primary Examiner

H. C. POST III, Assistant Examiner